US012581322B2

(12) United States Patent
Chen et al.

(10) Patent No.: US 12,581,322 B2
(45) Date of Patent: Mar. 17, 2026

(54) TRANSMISSION CONFIGURATION METHOD, TRANSMISSION CONFIGURATION DETERMINATION METHOD, BASE STATION AND TERMINAL

(71) Applicant: HEDWIG WIRELESS TECHNOLOGIES LLC, Round Rock, TX (US)

(72) Inventors: Yijian Chen, Shenzhen (CN); Zhaohua Lu, Shenzhen (CN); Yu Ngok Li, Shenzhen (CN); Bo Gao, Shenzhen (CN)

(73) Assignee: HEDWIG WIRELESS TECHNOLOGIES LLC, Round Rock, TX (US)

( * ) Notice: Subject to any disclaimer, the term of this patent is extended or adjusted under 35 U.S.C. 154(b) by 6 days.

(21) Appl. No.: 18/244,588

(22) Filed: Sep. 11, 2023

(65) Prior Publication Data

US 2023/0422056 A1     Dec. 28, 2023

Related U.S. Application Data

(63) Continuation of application No. 17/580,569, filed on Jan. 20, 2022, now Pat. No. 11,758,418, which is a
(Continued)

(30) Foreign Application Priority Data

Nov. 3, 2016     (CN) .......................... 201610974234.5

(51) Int. Cl.
*H04W 24/02*     (2009.01)
*H04B 7/0413*     (2017.01)
(Continued)

(52) U.S. Cl.
CPC .......... *H04W 24/02* (2013.01); *H04B 7/0413* (2013.01); *H04B 7/06966* (2023.05); *H04L 5/0048* (2013.01); *H04L 41/0806* (2013.01)

(58) Field of Classification Search
CPC .... H04B 7/0413; H04B 7/0695; H04B 7/088; H04L 41/0806; H04L 5/0048; H04W 24/02
See application file for complete search history.

(56) References Cited

U.S. PATENT DOCUMENTS

2012/0127938 A1 *     5/2012     Lv ......................... H04W 72/12
                                                                    370/329
2012/0281556 A1     11/2012     Sayana et al.
(Continued)

FOREIGN PATENT DOCUMENTS

CN     101815248 A     8/2010
CN     102291737 A     12/2011
(Continued)

OTHER PUBLICATIONS

Chinese First Search Report for Chinese Patent Application No. 2016109742345 Dated Jan. 13, 2022.
(Continued)

*Primary Examiner* — Mansour Oveissi
(74) *Attorney, Agent, or Firm* — VOLPE KOENIG

(57)     ABSTRACT

A transmission configuration method includes: determining a candidate transmission configuration information set, where the determined candidate transmission configuration information set includes K types of transmission configuration information, and each of the K types of transmission configuration information is used for implementing transmission configuration of at least one of a signal or a channel, where K is greater than or equal to 1; selecting at least one type of transmission configuration information from the determined candidate transmission configuration informa-
(Continued)

Determine candidate transmission configuration information set, where the determined candidate transmission configuration information set includes K types of transmission configuration information, and each of the K types of transmission configuration information is used for implementing transmission configuration of a signal and/or a channel, where K is greater than or equal to 1 — 401

Select at least one type of transmission configuration information from the determined candidate transmission configuration information set — 402

Transmit the selected transmission configuration information to the terminal by using a signaling — 403 tion set; and transmitting the selected transmission configuration information to a terminal by using a signaling.

19 Claims, 5 Drawing Sheets

Related U.S. Application Data continuation of application No. 16/347,392, filed as application No. PCT/CN2017/109123 on Nov. 2, 2017, now Pat. No. 11,265,735.

(51) Int. Cl.

| | | |
|---|---|---|
| *H04B 7/06* | (2006.01) | |
| *H04L 5/00* | (2006.01) | |
| *H04L 41/0806* | (2022.01) | |

(56) References Cited

U.S. PATENT DOCUMENTS

| | | | | |
|---|---|---|---|---|
| 2012/0309405 | A1 | 12/2012 | Parkvall et al. | |
| 2013/0286960 | A1 | 10/2013 | Li et al. | |
| 2014/0269458 | A1 | 9/2014 | Joung | |
| 2014/0307827 | A1 | 10/2014 | Liu et al. | |
| 2016/0183308 | A1* | 6/2016 | Eriksson | H04W 72/0446 |
| | | | | 370/329 |
| 2016/0269160 | A1 | 9/2016 | Noh et al. | |
| 2017/0332362 | A1 | 11/2017 | Li et al. | |
| 2018/0083680 | A1 | 3/2018 | Guo et al. | |
| 2019/0082456 | A1* | 3/2019 | Kim | H04L 27/2602 |
| 2019/0104549 | A1 | 4/2019 | Deng et al. | |
| 2019/0222411 | A1 | 7/2019 | Xie et al. | |
| 2019/0254038 | A1* | 8/2019 | Zhang | H04W 72/044 |
| 2019/0313397 | A1 | 10/2019 | Chen et al. | |
| 2020/0053800 | A1 | 2/2020 | Deng et al. | |
| 2020/0304256 | A1 | 9/2020 | Park et al. | |

FOREIGN PATENT DOCUMENTS

| | | | |
|---|---|---|---|
| CN | 102412880 | A | 4/2012 |
| CN | 103503326 | A | 1/2014 |
| CN | 104620551 | A | 5/2015 |
| WO | 2016086144 | A1 | 6/2016 |

OTHER PUBLICATIONS

Chinese Offce Action for Chinese Patent Application No. 201610974234.5 Dated Jan. 21, 2022.

Extended European Search Report of Corresponding European Patent Application No. 17867449.5, 9 Pages (Apr. 6, 2020).

International Search Report Dated Dec. 15, 2017 For International Application No. PCT/CN2017/109123, 5 Pages.

Written Opinion of the International Searching Authority Dated Dec. 15, 2017 For International Application No. PCT/CN2017/109123, 4 Pages.

R1-1608664; High Level Views On Beam Management for NR-MIMO; 3GPP TSGRAN WG1 Meeting #86BIS; ZTE Microelectronics; Lisbon, Portugal, Oct. 10-14, 2016 https://www.3gpp.org/ftp/TSG_RAN/WG1_RL1/TSGR1_86b/Docs/R1-1608664.zip.

R1-1610437; Beam Grouping for Beam Management; 3GPP TSG RAN WG1 Meeting #86BIS; ZTE Microelectronics; Lisbon, Portugal Oct. 10-14, 2016 https://www.3gpp.org/ftp/TSG_RAN/WG1_RL1/TSGR1_86b/Docs/R1-1610437.zip.

R1-1610512; WF On Group-Based Beam Management; 3GPP TSG RAN WG1 Meeting #86BIS; ZTE Microelectronics; Lisbon, Portugal Oct. 10-14, 2016 https://www.3gpp.org/ftp/TSG_RAN/WG1_RL1/TSGR1_86b/Docs/R1-1610512.zip.

R1-1610511; WF On Beam Management for DL Control Channel; 3GPP TSG RAN WG1 Meeting#86BIS; ZTE Microelectronics; Lisbon, Portugal Oct. 10-14, 2016 https://www.3gpp.org/ftp/TSG_RAN/WG1_RL1/TSGR1_86b/Docs/R1-1610511.zip.

R1-1610891; WF On Group-Based Beam Management; 3GPP TSG RAN WG1 Meeting #86BIS; ZTE Microelectronics; Lisbon, Portugal Oct. 10-14, 2016 https://www.3gpp.org/ftp/TSG_RAN/WG1_RL1/TSGR1_86b/Docs/R1-1610891.zip.

3GPP TS 36. 321 V14.0.0; Evolved Universal Terrestrial Radio Access (E-UTRA); Medium Access Control (MAC) Protocol Specification (Sep. 2016) https://www.3gpp.org/ftp/Specs/archive/36_series/36.321/36321-e00.zip.

3GPP TS 36.213 V14.0.0; Evolved Universal Terrestrial Radio Access (E-UTRA); Physical Layer Procedures; (Sep. 2016) https://www.3gpp.org/ftp/Specs/archive/36_series/36.213/36213-e00.zip.

3GPP TS 36.331 v14.0.0; Evolved Universal Terrestrial Radio Access (E-UTRA); Radio Resource Control (RRC); Protocol Specification; https://www.3gpp.org/ftp/Specs/archive/36_series/36.331/36331-e00.zip.

"Beam Management," 3GPP TSG RAN WG2 Meeting #95, R2-164898, Gothenburg, Sweden (Aug. 22-26, 2016).

R1-1610539; WF on Beam management; 3GPP TSG RAN WG1 Meeting #86bis, Lisbon, Portugal Oct. 10-14, 2016.

R1-1610275; Extended framework for QCL assumptions; 3GPP TSG RAN WG1#86bis, Lisbon, Portugal Oct. 10-14, 2016.

\* cited by examiner

Determine candidate transmission configuration information set, where the determined candidate transmission configuration information set includes K types of transmission configuration information, and each of the K types of transmission configuration information is used for implementing transmission configuration of a signal and/or a channel, where K is greater than or equal to 1     401

Select at least one type of transmission configuration information from the determined candidate transmission configuration information set     402

Transmit the selected transmission configuration information to the terminal by using a signaling     403

FIG. 4

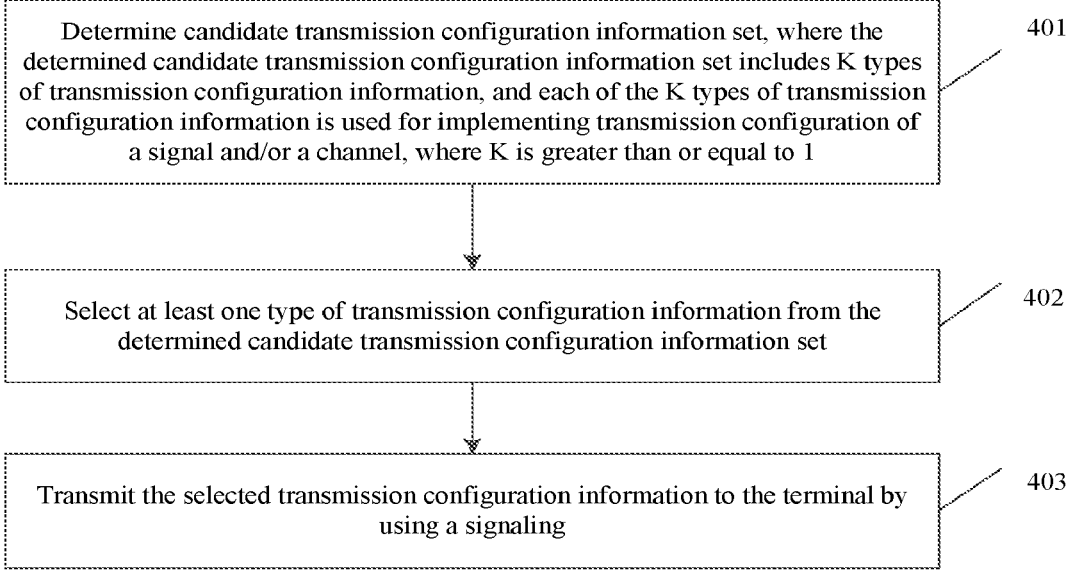

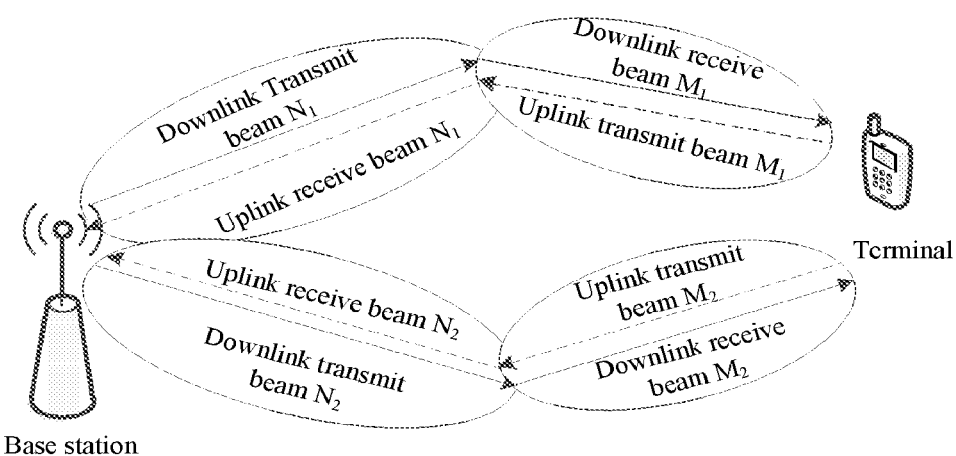

Downlink Transmit beam $N_1$

Downlink receive beam $M_1$

Uplink receive beam $N_1$

Uplink transmit beam $M_1$

Uplink receive beam $N_2$

Uplink transmit beam $M_2$

Downlink transmit beam $N_2$

Downlink receive beam $M_2$

Terminal

Base station

FIG. 5

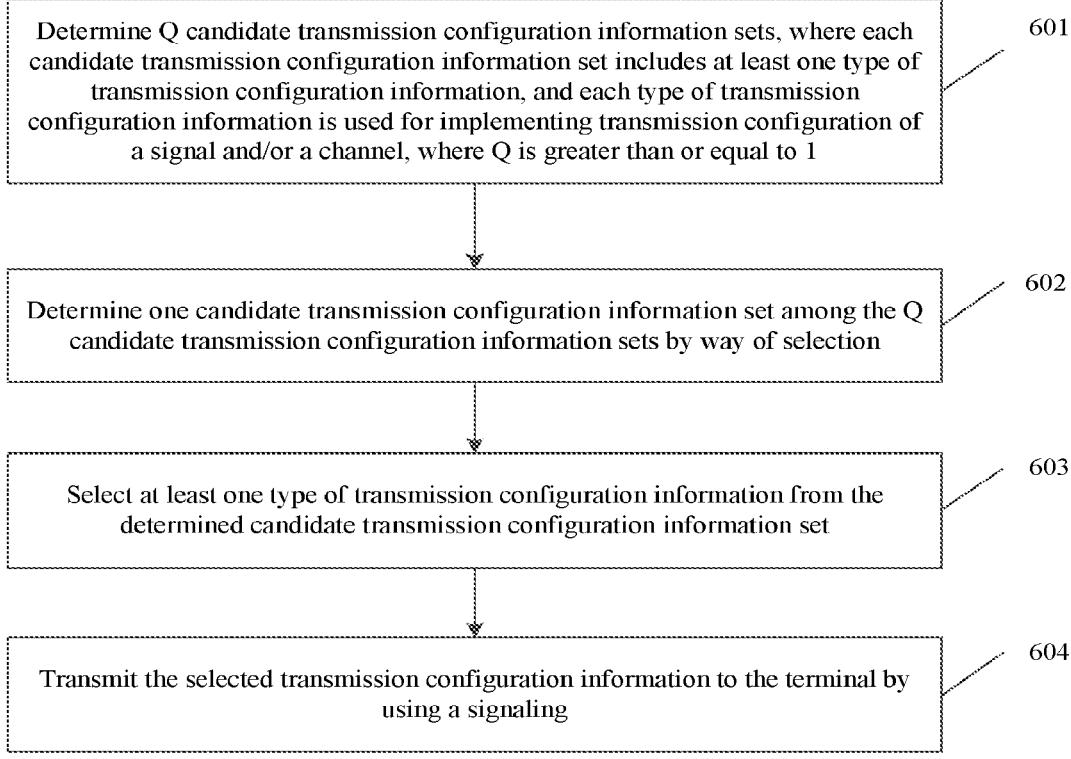

Determine Q candidate transmission configuration information sets, where each candidate transmission configuration information set includes at least one type of transmission configuration information, and each type of transmission configuration information is used for implementing transmission configuration of a signal and/or a channel, where Q is greater than or equal to 1          601

Determine one candidate transmission configuration information set among the Q candidate transmission configuration information sets by way of selection          602

Select at least one type of transmission configuration information from the determined candidate transmission configuration information set          603

Transmit the selected transmission configuration information to the terminal by using a signaling          604

FIG. 6

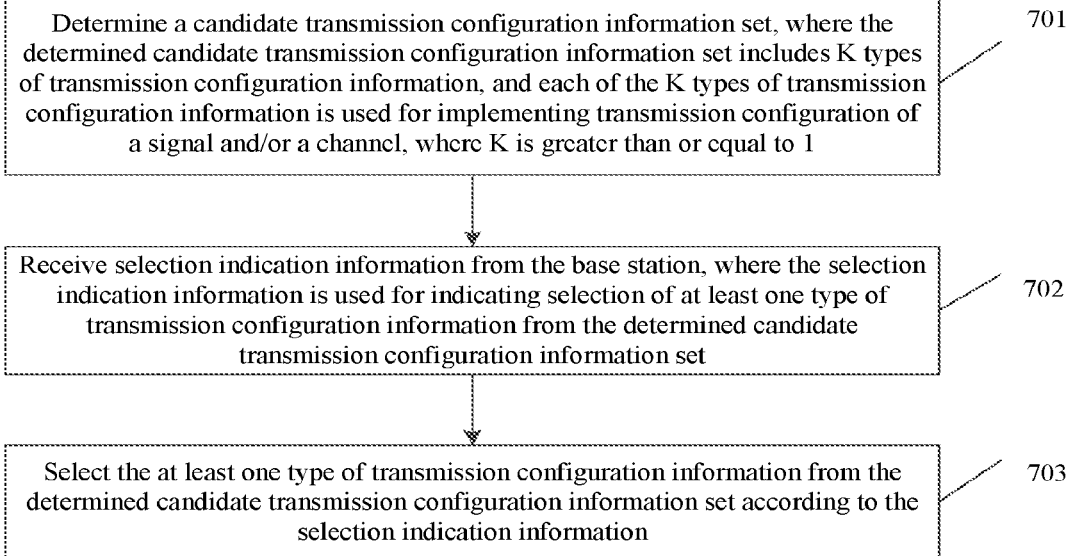

Determine a candidate transmission configuration information set, where the determined candidate transmission configuration information set includes K types of transmission configuration information, and each of the K types of transmission configuration information is used for implementing transmission configuration of a signal and/or a channel, where K is greater than or equal to 1          701

Receive selection indication information from the base station, where the selection indication information is used for indicating selection of at least one type of transmission configuration information from the determined candidate transmission configuration information set          702

Select the at least one type of transmission configuration information from the determined candidate transmission configuration information set according to the selection indication information          703

FIG. 7

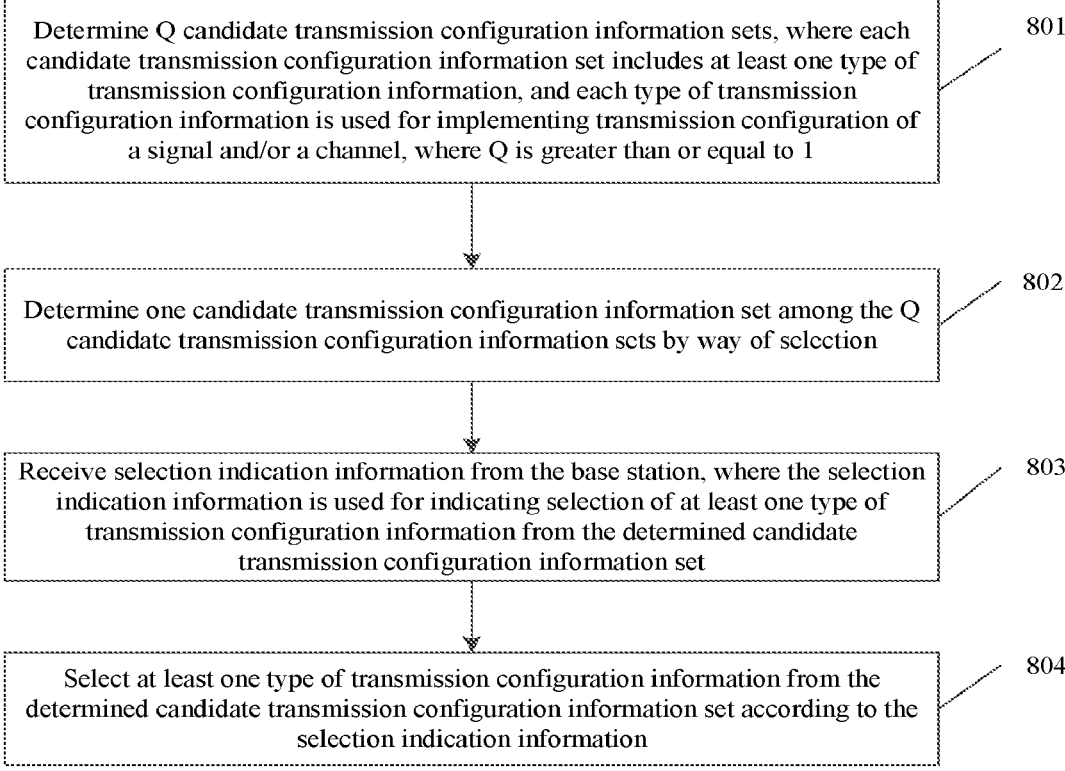

Determine Q candidate transmission configuration information sets, where each candidate transmission configuration information set includes at least one type of transmission configuration information, and each type of transmission configuration information is used for implementing transmission configuration of a signal and/or a channel, where Q is greater than or equal to 1 — 801

Determine one candidate transmission configuration information set among the Q candidate transmission configuration information sets by way of selection — 802

Receive selection indication information from the base station, where the selection indication information is used for indicating selection of at least one type of transmission configuration information from the determined candidate transmission configuration information set — 803

Select at least one type of transmission configuration information from the determined candidate transmission configuration information set according to the selection indication information — 804

FIG. 8

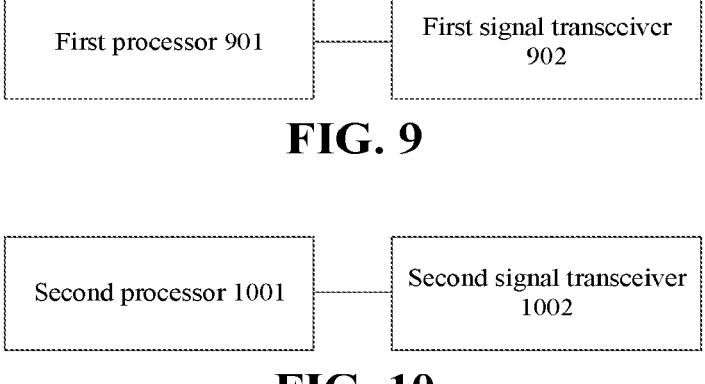

First processor 901 — First signal transceiver 902

FIG. 9

Second processor 1001 — Second signal transceiver 1002

FIG. 10

TRANSMISSION CONFIGURATION METHOD, TRANSMISSION CONFIGURATION DETERMINATION METHOD, BASE STATION AND TERMINAL

CROSS REFERENCE TO RELATED APPLICATIONS

The present application is a continuation of U.S. patent application Ser. No. 17/580,569, filed on Jan. 20, 2022, which will issue on Sep. 12, 2023 as U.S. Pat. No. 11,758, 418, which is a continuation application of U.S. patent application Ser. No. 16/347,392, filed on May 3, 2019, which issued on Mar. 1, 2022 as U.S. Pat. No. 11,265,735, which is a U.S. National Stage Application, filed under 35 U.S.C. 371 of International Patent Application No. PCT/CN2017/109123, filed on Nov. 2, 2017, which claims priority to Chinese patent application No. 201610974234.5 filed on Nov. 3, 2016, the contents of all of which are incorporated herein by reference in their entireties.

BACKGROUND

Field

The present application relates to, but is not limited to, the field of wireless communication technologies and, in particular, to a transmission configuration method, a transmission configuration determination method, a base station, a terminal and a computer storage medium.

Description of the Related Technology

In a wireless communication system, a base station and a terminal may use multiple antennas for transmission to obtain higher sending rate and receiving rate. One principle of the multi-antenna technology is to utilize some of channel characteristics to perform beamforming to achieve sending and receiving that match the channel characteristics. The signal has high radiation direction. This can improve the system performance effectively and improve the communication performance significantly without increasing bandwidth and power consumption. Therefore, the multi-antenna technology is a promising technology widely used in current communication systems. FIG. 1 is a schematic diagram of the beamforming technology. As shown in FIG. 1, at the base station, signals processed by radio frequency (RF) paths are sent to a transmitting antenna array. This transmitting antenna array is composed of array elements. A directional beam is generated by the array elements of the transmitting antenna array through the beamforming technology. After reflected by a reflecting surface, the directional beam is received by the terminal. The receiving antenna array of the terminal is composed of array elements. The signals, which are received by the receiving antenna array, pass through splitters and phase shifters, and are sent to RF paths for further processing.

Beamforming is achieved by precoding. A beam may be formed in a feature space or a physical space by precoding. The precoding may include two parts: baseband precoding corresponding to a base beam and RF precoding corresponding to an RF beam. The baseband processing primarily acts on a baseband path. The RF processing primarily acts on the oscillator of an RF path. The baseband processing is done on a baseband and the RF processing is done on a radio frequency. The beam here may be a baseband beam, an RF beam or a combination thereof.

In the case where a large-scale antenna is deployed on the base station, in view of high channel dimensions and coexistence of RF precoding and baseband precoding, measurement feedback and transmission in a Multiple-Input Multiple-Output (MIMO) system may be implemented by means of beam information measurement feedback. The beam information measurement feedback, that is, a beam training process, includes the followings.

The base station sends beam pilots in different directions; and notifies the terminal of configuration information.

The terminal measures the reception quality of the beam pilots and feeds back pilots of high reception quality to the base station.

The base station transmits data by using the precoding corresponding to the received pilots of high reception quality.

Here the base station continues to send beams with a narrower bandwidth within the coverage of the selected beams, and the terminal performs selection from the received beams. This refines beams. The base station obtains more accurate beam direction information through feedback from the terminal. These beam training may be performed multiple times.

Alternatively, the base station may send more pilot signals on the basis of the beams reported by the terminal. These pilot signals are used for measuring interference between beams or optimal weighting and combination parameters between beams. The weighting processes are typically performed on the baseband to obtain a larger combination gain. In fact, they may also be regarded as more accurate beams (beams in the feature space).

After acquiring the information on beam selection, the base station may use the selected beams to perform downlink transmission. If Channel State Information (CSI) may be further obtained, the transmission performance can be improved more effectively.

For an uplink transmission process, if reciprocity exists, when the terminal selects the best transmit beam, if a same beam is transmitted multiple times, the terminal tries to receive by using multiple different beams. FIG. 2 is a schematic diagram illustrating reception of beams on a terminal. As shown in FIG. 2, the terminal may scan M transmit beams (that is, a transmit beam 1, a transmit beam 2, . . . , a transmit beam M) by using a beam scan block 1, a beam scan block 2, . . . , a beam scan block M. M is an integer greater than one. Beam scan block 1 through beam scan block M correspond to receive beam 1 to receive beam M respectively. That is to say, for M transmit beams, the terminal selects a receive beam that the terminal considers to be best. For each different transmit beam, the best receive beam may be different. This can be understood as that the different angles of emergence of the multiple paths in a channel correspond to different angles of arrival. Here the receive beam may be reciprocated as an uplink transmit beam.

The beam transmission is further described below.

FIG. 3 is a schematic diagram of beam transmission. As shown in FIG. 3, in the Time Division Duplexing (TDD) system in which reciprocity exists, after the above-mentioned beam training is completed, the base station may indicate which beam the base station will use for transmission, for example, the beam dl txbeam Ni for transmission. Thus, for downlink transmission, the terminal can understand the transmission behavior of the base station. Therefore, the optimal downlink receive beam dl rxbeam Mk corresponding to the downlink transmit beam dl txbeam Ni may be used for reception.

For uplink transmission, when the downlink uses the transmit beam dl txbeam Ni for transmission, the terminal considers its own optimal receive beam to be dl rx beam Mk. The uplink transmit beam ul tx beam Mk can be obtained by way of reciprocating the receive beam dl rx beam Mk to the uplink. Then the base station receives by using the uplink receive beam ul tx beam Ni that is reciprocal with the transmit beam dl txbeam Ni.

Therefore, for the above-mentioned communication system with reciprocity, once the base station notifies the terminal of the optimal downlink transmit beam, what beam the terminal uses to perform downlink reception and what beam the terminal uses to perform uplink transmission are determined. The terminal may transmit a Physical Downlink Control Channel (PDCCH), a Physical Downlink Shared Channel (PDSCH), a downlink channel measurement reference signal (SI-RS), a Physical Uplink Control Channel (PUCCH), a Physical Uplink Shared Channel (PUSCH) and an uplink Sounding Reference Signal (SRS) by using a determined beam or by using a narrower beam within a determined beam range.

Two methods are provided for indicating the downlink transmit beam to the terminal and are described below.

Method 1: A beam index is indicated by a signaling at the Media Access Control (MAC) layer. The base station indicates, by using the signaling at the MAC layer, allocation of one beam to the terminal. However, switching is generally slow when beam indication is performed by the signaling at the MAC layer.

Method 2: The physical layer of the base station triggers one beam information feedback, and indicates the receive and transmit beams to the terminal on the basis of the feedback information. For example, the terminal may measure X beams and report the X beams to the base station on the basis of the beam pilots. After receiving measurement information, the base station uses the best transmit beam by default and the best transmit beam works after a delay of time units. X is greater than or equal to 1, and t is greater than 0.

When the transmit and receive beams are configured, there may be a case where the transmit beams and the receive beams are flexibly configured according to actual application scenarios and application requirements. The following exemplarily describes several cases.

Case 1: The uplink transmission and the downlink transmission are always bound to one pair of beams through reciprocity. Therefore, the uplink transmission and the downlink transmission always have a strong binding relationship, and it is impossible to perform downlink transmission and uplink transmission using antennas in separate positions. For example, the case where the antenna spacing is large, and transmitting antenna element 1 is used to transmit in the downlink and the antenna element 2 is used to receive in the uplink often appears in a heterogeneous network. For example, a macro base station serves in the downlink and a micro base station receives in the uplink. This saves uplink terminal transmission power and achieves flexibly load balancing.

Case 2: The control channel (or signal) and the data channel (or signal) are always bound to the same beam, and the following beam selection scheme cannot be implemented: the beam of the control channel (or signal) is selected on the basis of the beam obtained from one type of pilot measurement feedback while the beam of the data channel (or signal) is selected on the basis of the beam obtained from another type of pilot measurement feedback.

Case 3: A beam can be indicated by downlink-pilot-based measurement and the beam selection result and cannot be indicated by uplink-pilot-based measurement and the beam selection result. In this way, the definition of the beam is single and not flexible and thus not applicable to various application scenarios.

Case 4: The beam of a pilot signal is bound to a data/control channel or signal, and pilot signals outside the beam range indicated by the measurement cannot be used.

Therefore, the flexibility in configuration of a transmit beam and a receive beam is greatly limited, thereby resulting in a decrease in the transmission performance of the communication system. It is to be noted that here the beam indication information may explicitly indicate information about one beam index, may indicate that the transmission manner is bound to the transmission/reception manner of a resource (for example, a time-frequency-code resource), or may indicate a spatial correlation similar to the spatial correlation of a signal and/or channel on a resource (for example, a time-frequency-code resource). The spatial correlation may be the spatial correlation of a transmit angle or an arrival angle.

SUMMARY OF CERTAIN INVENTIVE ASPECTS

The following is the summary of the subject matter described herein in detail. This summary is not intended to limit the scope of the claims.

Embodiments of the present disclosure provide a transmission configuration method, a transmission configuration determination method, a base station, a terminal and a computer storage medium, which can implement flexible configuration of transmission information.

Embodiments of the present disclosure provide a transmission configuration method. The method includes:

determining a candidate transmission configuration information set, where the determined candidate transmission configuration information set includes K types of transmission configuration information, and each of the K types of transmission configuration information is used for implementing transmission configuration of at least one of a signal or a channel, where K is greater than or equal to 1;

selecting at least one type of transmission configuration information from the determined candidate transmission configuration information set; and transmitting the selected transmission configuration information to a terminal by using a signaling.

Embodiments of the present disclosure further provide a transmission configuration determination method. The method includes:

determining a candidate transmission configuration information set, where the determined candidate transmission configuration information set includes K types of transmission configuration information, and each of the K types of transmission configuration information is used for implementing transmission configuration of at least one of a signal or a channel, where K is greater than or equal to 1;

receiving selection indication information from a base station, where the selection indication information is used for indicating selection of at least one type of transmission configuration information from the determined candidate transmission configuration information set; and selecting the at least one type of transmission configuration information from the determined candidate transmission configuration information set according to the selection indication information.

Embodiments of the present disclosure further provide a base station. The base station includes: a first processor and a first signal transceiver.

The first processor is configured to determine a candidate transmission configuration information set, where the determined candidate transmission configuration information set includes K types of transmission configuration information, and each of the K types of transmission configuration information is used for implementing transmission configuration of at least one of a signal or a channel, where K is greater than or equal to 1.

The first processor is further configured to select at least one type of transmission configuration information from the determined candidate transmission configuration information set and to send the selected transmission configuration information to the first signal transceiver.

The first signal transceiver is configured to transmit the selected transmission configuration information to a terminal by using a signaling.

Embodiments of the present disclosure further provide a terminal. The terminal includes: a second processor and a second signal transceiver.

The second processor is configured to determine a candidate transmission configuration information set, where the determined candidate transmission configuration information set includes K types of transmission configuration information, and each of the K types of transmission configuration information is used for implementing transmission configuration of at least one of a signal or a channel, where K is greater than or equal to 1.

The second signal transceiver is configured to receive selection indication information from a base station and to send the selection indication information to the second processor, where the selection indication information is used for indicating selection of at least one type of transmission configuration information from the determined candidate transmission configuration information set.

The second processor is further configured to select the at least one type of transmission configuration information from the determined candidate transmission configuration information set according to the selection indication information.

Embodiments of the present disclosure further provide a computer storage medium. The computer storage medium is configured to store program instructions. The instructions include:

determining a candidate transmission configuration information set, where the determined candidate transmission configuration information set includes K types of transmission configuration information, and each of the K types of transmission configuration information is used for implementing transmission configuration of at least one of a signal or a channel, where K is greater than or equal to 1;

selecting at least one type of transmission configuration information from the determined candidate transmission configuration information set; and transmitting the selected transmission configuration information to a terminal by using a signaling.

Embodiments of the present disclosure further provide another computer storage medium. The computer storage medium is configured to store program instructions. The instructions include:

determining a candidate transmission configuration information set, where the determined candidate transmission configuration information set includes K types of transmission configuration information, and each of the K types of transmission configuration information is used for implementing transmission configuration of at least one of a signal or a channel, where K is greater than or equal to 1;

receiving selection indication information from a base station, where the selection indication information is used for indicating selection of at least one type of transmission configuration information from the determined candidate transmission configuration information set; and selecting the at least one type of transmission configuration information from the determined candidate transmission configuration information set according to the selection indication information.

In the transmission configuration method, transmission configuration determination method, base station, terminal and computer storage medium provided in embodiments of the present disclosure, a candidate transmission configuration information set is determined, where the determined candidate transmission configuration information set includes K types of transmission configuration information, and each of the K types of transmission configuration information is used for implementing transmission configuration of at least one of a signal or a channel, where K is greater than or equal to 1; at least one type of transmission configuration information is selected from the determined candidate transmission configuration information set; and the selected transmission configuration information is transmitted to the terminal by using a signaling. In this way, the transmission configuration information can be configured flexibly, thereby better meeting the transmission requirements and improving the transmission performance of the communication system.

Other aspects can be understood after the accompanying drawings and detailed description are read and understood.

BRIEF DESCRIPTION OF THE DRAWINGS

FIG. 4 is a flowchart of one embodiment of a transmission configuration method according to embodiments of the present disclosure;

FIG. 5 is a schematic diagram illustrating beam transmission based on transmission configuration information according to a first embodiment of the present disclosure;

FIG. 6 is a flowchart of another embodiment of a transmission configuration method according to embodiments of the present disclosure;

FIG. 7 is a flowchart of one embodiment of a transmission configuration determination method according to embodiments of the present disclosure;

FIG. 8 is a flowchart of another embodiment of a transmission configuration determination method according to embodiments of the present disclosure;

FIG. 9 is a structure diagram of a base station according to embodiments of the present disclosure; and FIG. 10 is a structure diagram of a terminal according to embodiments of the present disclosure.

DETAILED DESCRIPTION OF CERTAIN ILLUSTRATIVE EMBODIMENTS

Figure 1:
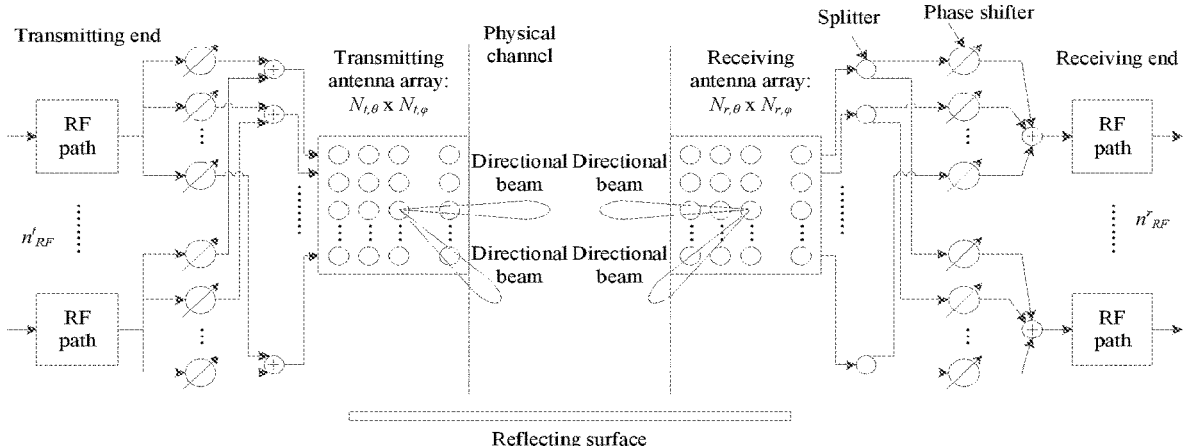
FIG. 1 is a schematic diagram of the beamforming technology.
Figure 2:
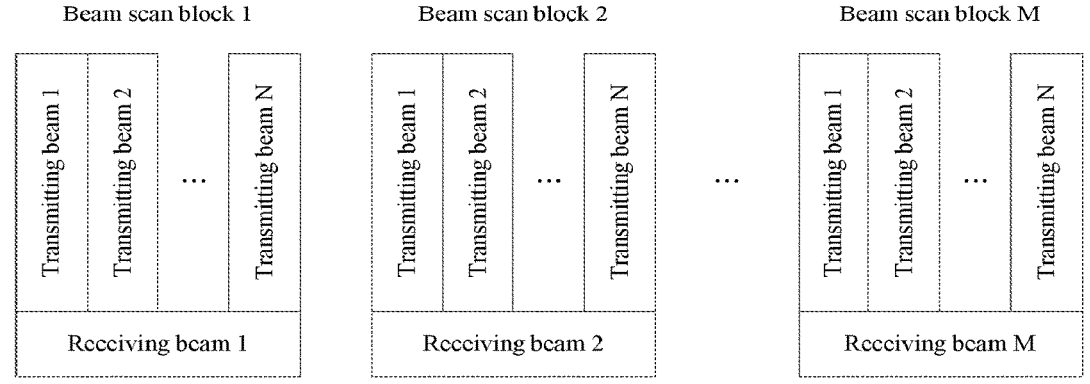
FIG. 2 is a schematic diagram illustrating reception of beams on a terminal.
Figure 3:
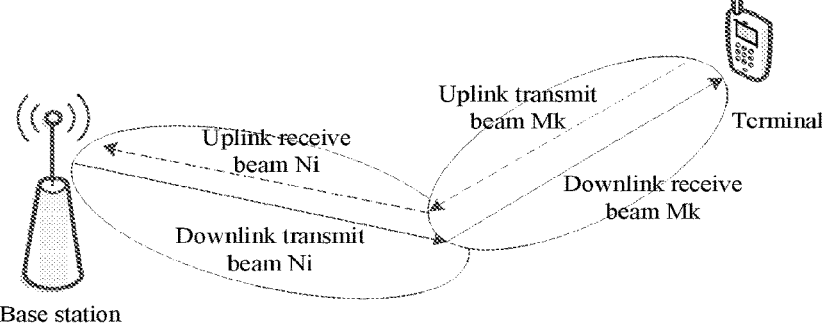
FIG. 3 is a schematic diagram of beam transmission.

Embodiments of the present disclosure will be described in detail with reference to the accompanying drawings.

First Embodiment

A first embodiment of the present disclosure provides a transmission configuration method. The method is applicable to network-side equipment such as a base station. FIG. 4 is a flowchart of one embodiment of a transmission configuration method according to embodiments of the present disclosure. As shown in FIG. 4, the method includes the followings.

In 401, a candidate transmission configuration information set is determined, where the determined candidate transmission configuration information set includes K types of transmission configuration information, and each of the K types of transmission configuration information is used for implementing transmission configuration of a signal and/or a channel, where K is greater than or equal to 1.

In an implementation, each piece of transmission configuration information in the determined candidate transmission configuration information set may be used for configuration of an uplink channel and/or a downlink channel, and/or may be used for configuration of an uplink signal and/or a downlink signal. Here the types of the uplink channel, the uplink signal, the downlink channel and the downlink channel are not limited.

In an implementation, the determined candidate transmission configuration information set includes transmission configuration information corresponding to at least two types of signals. That is, the determined candidate transmission configuration information set includes transmission configuration information in transmission association with at least two types of signals. In embodiments of the present disclosure, if a type of signal or a type of channel is in transmission association with a piece of transmission configuration information, then the transmission of this type of signal or this type of channel is configured using the transmission configuration information in transmission association with this type of signal or this type of channel. For example, if a type of signal or a type of channel has been received or sent, then "transmission association" means "the same as or similar to" a transmission strategy for receiving or sending this type of signal or this type of channel, including a sending strategy and/or a receiving strategy. In this way, the transmission configuration information can be used for the transmission of the current channel or signal. The classification criteria for signals are not limited.

To achieve a higher flexibility in transmission configuration, in one embodiment, pieces of transmission configuration information in the candidate transmission configuration information set may correspond to the same type/set of pilot signals or may correspond to different types/sets of pilot signals.

For example, the candidate transmission configuration information set is a transmission configuration information set described in Table 1.

TABLE 1

| Candidate transmission configuration information set | |
| --- | --- |
| Transmission configuration information 1 | Pilot type A, first set of pilots |
| Transmission configuration information 2 | Pilot type B, first set of pilots |
| Transmission configuration information 3 | Pilot type B, second set of pilots |
| Transmission configuration information 4 | Pilot type C, second set of pilots |

That is to say, the candidate transmission configuration information set may be in transmission association with different types of pilot signals or may be bound to different sets of pilot signals of the same type of pilot. Here the different sets of pilot signals correspond to their respective transmission configuration information.

For example, one candidate transmission configuration information set is in transmission association with two Channel State Information-Reference Signal (CSI-RS) sets having different configurations, or in transmission association with one CSI-RS set and one Sounding Reference Signal (SRS) set, or in transmission association with one synchronization signal set and one CSI-RS or SRS set, or in transmission association with one Beam Reference Signal (BRS) set and one CSI-RS set, or in transmission association with one BRS set and one SRS set, or in transmission association with one BRS set and one Demodulation Reference Signal (DMRS) set. Here the synchronization signals may be downlink synchronization signals or uplink random access signals (or referred to as uplink synchronization signals).

The candidate transmission configuration information set may be determined in the manners described below.

In the first manner, the candidate transmission configuration information set is configured by the base station by using a high-layer signaling. Here the high-layer signaling may be a protocol-layer signaling above the physical layer, such as a MAC-layer signaling and a Radio Resource Control (RRC)-layer signaling.

In the second manner, the candidate transmission configuration information set is fed back by a terminal. In an implementation, the base station may send a signaling to the terminal to instruct the terminal to determine transmission configuration information; after receiving the signaling, the terminal sends the base station a transmission configuration information set determined by the terminal.

In the third manner, the candidate transmission configuration information set is determined by information fed back by the terminal. In an implementation, when receiving the feedback information of the terminal, the base station may determine the candidate transmission configuration information set according to the feedback information.

In the fourth manner, the candidate transmission configuration information set is determined by the base station according to an uplink pilot measurement result. In an implementation, the base station receives the uplink pilot measurement result sent by the terminal, and then determines the candidate transmission configuration information set according to the uplink pilot measurement result.

In 402, at least one type of transmission configuration information is selected from the determined candidate transmission configuration information set.

By way of example, the at least one type of transmission configuration information may be selected from the determined candidate transmission configuration information set according to transmission configuration selection indication information. In practical use, the transmission configuration selection indication information may be configured by the base station by using a physical-layer signaling.

In one embodiment, at least one of uplink channels, uplink signals, downlink channels or downlink signals may be grouped; then transmission configuration information is selected, for each group of channels or signals, from the determined candidate transmission configuration information set. Correspondingly, transmitting the selected transmission configuration information to the terminal by using the signaling includes: transmitting the transmission configuration information corresponding to the each group of channels or signals to the terminal by using a separate signaling.

Several grouping manners are described below by way of example.

Grouping manner 1: A group composed of uplink control channels and downlink control channels, a group composed of downlink measurement pilot signals and uplink measurement pilot signals, and a group composed of uplink data and downlink data are formed.

Grouping manner 2: A group composed of downlink control channels, a group composed of downlink data channels, a group composed of downlink pilot signals, a group composed of uplink control channels, a group composed of uplink data channels, and a group composed of uplink pilot signals are formed.

Further, when multiple different sets of downlink pilot signals exist, the multiple different sets of downlink pilot signals may be grouped into the same group or different groups.

Further, when multiple different sets of uplink pilot signals exist, the multiple different sets of uplink pilot signals may be grouped into the same group or different groups.

Further, when multiple different sets of downlink control channels exist, the multiple different sets of downlink control channels may be grouped into the same group or different groups.

Further, when multiple different sets of uplink control channels exist, the multiple different sets of uplink control channels may be grouped into the same group or different groups.

The grouping manner may be pre-agreed by the base station and the terminal, or may be determined by the base station and then notified by the base station to the terminal. The base station may pre-configure the grouping manner for the terminal by using a high-layer signaling.

In an implementation, after grouping, different transmission configuration information may be selected, for different groups, from the candidate transmission configuration information set. Therefore, for different groups, the base station may send different signalings to the terminal to instruct the terminal to select the corresponding transmission configuration information. In this case, different signals from the base station to the terminal may be separate.

In another embodiment, this may be implemented in the manners described below.

Manner 1

Transmission configuration information is selected, for an uplink channel and a downlink channel separately, from the determined candidate transmission configuration information set; and correspondingly, transmitting the selected transmission configuration information to the terminal by using the signaling includes: transmitting the transmission configuration information corresponding to the uplink channel and the downlink channel separately to the terminal by using separate signalings.

Manner 2

Transmission configuration information is selected, for an uplink signal and a downlink signal separately, from the determined candidate transmission configuration information set; and correspondingly, transmitting the selected transmission configuration information to the terminal by using the signaling includes: transmitting the transmission configuration information corresponding to the uplink signal and the downlink signal separately to the terminal by using separate signalings.

Manner 3

Transmission configuration information is selected, for a pilot signal and a control channel separately, from the determined candidate transmission configuration information set; and correspondingly, transmitting the selected transmission configuration information to the terminal by using the signaling includes: transmitting the transmission configuration information corresponding to the pilot signal and the control channel separately to the terminal by using separate signalings.

Manner 4

Transmission configuration information is selected, for the pilot signal and a data channel separately, from the determined candidate transmission configuration information set; and correspondingly, transmitting the selected transmission configuration information to the terminal by using the signaling includes: transmitting the transmission configuration information corresponding to the pilot signal and the data channel separately to the terminal by using separate signalings.

Manner 5

Transmission configuration information is selected, for multiple types of pilot signals or multiple sets of pilot signals separately, from the determined candidate transmission configuration information set; and correspondingly, transmitting the selected transmission configuration information to the terminal by using the signaling includes: transmitting the transmission configuration information corresponding to the types of pilot signals or the sets of pilot signals separately to the terminal by using separate signalings.

Manner 6

Transmission configuration information is selected, for multiple control regions of time-frequency-code resources separately, from the determined candidate transmission configuration information set; and correspondingly, transmitting the selected transmission configuration information to the terminal by using the signaling includes: transmitting the transmission configuration information corresponding to the control regions of the time-frequency-code resources separately to the terminal by using separate signalings.

Manner 7

Transmission configuration information is selected, for multiple pieces of control information or a plurality of data information code blocks separately, from the determined candidate transmission configuration information set; and correspondingly, transmitting the selected transmission configuration information to the terminal by using the signaling includes: transmitting the transmission configuration information corresponding to the pieces of control information or the data information code blocks separately to the terminal by using separate signalings.

Manner 8

Transmission configuration information is selected, for multiple transport layers separately, from the determined candidate transmission configuration information set; and correspondingly, transmitting the selected transmission configuration information to the terminal by using the signaling includes: transmitting the transmission configuration information corresponding to the transport layers separately to the terminal by using separate signalings.

Further, after the at least one type of transmission configuration information is selected from the determined candidate transmission configuration information set, a channel and/or a signal may be received or sent according to the selected transmission configuration information.

In 403, the selected transmission configuration information is transmitted to the terminal by using a signaling.

On the basis of the first embodiment of the present disclosure, different transmission configuration information may be configured for a pilot signal and other channels (for example, a data channel or a control channel). For example, different beam transmission information is configured, so that the pilot signal can be flexibly transmitted.

Additionally, on the basis of the first embodiment of the present disclosure, different transmission configuration information may be configured for multiple control channels, multiple control blocks, multiple pieces of control information or multiple data information code blocks. For example, different beam transmission information is configured, so that the control information can be flexibly transmitted, and different robustness or transmission directions are present when different control information is transmitted.

The first embodiment of the present disclosure will be further described below by way of one example.

The candidate transmission configuration information set determined by the base station includes K types of transmission configuration information. For example, the candidate transmission configuration information set includes K types of transmission configuration information, and each type of transmission configuration information corresponds to an uplink/downlink transmit/receive beam acquired on the basis of a previous set of pilot signals or synchronization signals. The following describes an example in which K is equal to 2.

Uplink/downlink beam transmission is achieved by joint indication. In embodiments of the present disclosure, a transmission beam may be indicated for an uplink channel or signal and a downlink channel or signal separately.

FIG. 5 is a schematic diagram illustrating beam transmission based on transmission configuration information according to the first embodiment of the present disclosure. As shown in FIG. 5, in downlink transmission, the beam dl tx beam N1 is used to transmit and the beam dl rx beam M1 is used to receive; in uplink transmission, the beam ul tx beam M2 is used to transmit and the beam ul rx beam N2 is used to receive. Such beam transmission indication manner makes uplink transmission and downlink transmission performed in different paths, thereby saving the transmission power of the terminal and achieving uplink load balancing. That is to say, the base station can perform more flexible beam configuration, thereby better meeting the transmission requirements and improving the transmission performance of the communication system.

Here separate transmission configuration information is used in the uplink and in the downlink and thus is notified to the terminal by using separate signalings. For example, a 1-bit signaling is used to notify the downlink transmission configuration information, and another 1-bit signaling is used to notify the uplink transmission configuration information.

K may be greater than 2. When more paths exist in a channel, more paths can be used for transmission. In this case, the number of bits of the corresponding notification signaling will also increase, and is log 2(K) for each of the uplink and in the downlink.

Second Embodiment

A second embodiment of the present disclosure provides another transmission configuration method. The method is applicable to network-side equipment such as a base station.

FIG. 6 is a flowchart of another embodiment of a transmission configuration method according to embodiments of the present disclosure. As shown in FIG. 6, the method includes the followings.

In 601, Q candidate transmission configuration information sets are determined, where each candidate transmission configuration information set includes at least one type of transmission configuration information, and each type of transmission configuration information is used for implementing transmission configuration of a signal and/or a channel, where Q is greater than or equal to 1.

In an implementation, this may include: determining, according to the channel type and/or the signal type, Q candidate transmission configuration information sets, where each type of channel or each type of signal corresponds to at least one candidate transmission configuration information set. For example, the above-mentioned Q candidate transmission configuration information sets are described in Table 2.

TABLE 2

| Channel/signal type | Q candidate transmission configuration information sets |
| --- | --- |
| Downlink control channel | Candidate transmission configuration information set 1 |
| Downlink data channel | Candidate transmission configuration information set 1, candidate transmission configuration information set 2 |
| Downlink measurement pilot signal | Candidate transmission configuration information set 1, candidate transmission configuration information set 2, candidate transmission configuration information set 3 |

In an implementation, the Q candidate transmission configuration information sets may include: different candidate transmission configuration information sets corresponding to a control channel and a data channel separately.

Alternatively, the Q candidate transmission configuration information sets may include: different candidate transmission configuration information sets corresponding to the data channel and a measurement pilot signal separately.

Alternatively, the Q candidate transmission configuration information sets may include: different candidate transmission configuration information sets corresponding to the control channel and the measurement pilot signal separately.

Alternatively, the Q candidate transmission configuration information sets may include: Q1 candidate transmission configuration information sets corresponding to a first type of signal, and Q2 candidate transmission configuration information sets corresponding to a second type of signal, where Q1 is not equal to Q2.

Alternatively, the Q candidate transmission configuration information sets may include: Q3 candidate transmission configuration information sets corresponding to a first type of channel, and Q4 candidate transmission configuration information sets corresponding to a second type of channel, where Q3 is not equal to Q4.

Alternatively, the Q candidate transmission configuration information sets may include: Q5 candidate transmission configuration information sets corresponding to a third type of signal, and Q6 candidate transmission configuration information sets corresponding to a third type of channel, where Q5 is not equal to Q6.

To achieve a simpler transmission configuration process, the same Q candidate transmission configuration information sets may be configured for each type of channel or each type of signal, and then, a candidate transmission configuration information set may be further selected for each type of channel or each type of signal by using a subsequent signaling.

In an implementation, when Q is greater than 1, the Q candidate transmission configuration information sets include: different candidate transmission configuration information sets corresponding to two different reference signals separately.

In an implementation, when Q is greater than 1, the Q candidate transmission configuration information sets include: different candidate transmission configuration information sets corresponding to at least two different types of signals separately. Here the two different reference signals may be different types of reference signals, or may be different sets of reference signals of the same type. For example, exemplary Q candidate transmission configuration information sets are shown in Table 3.

TABLE 3

| Q candidate transmission configuration | |
| --- | --- |
| Candidate transmission configuration information set 1 | Pilot type A, first set of pilots |
| Candidate transmission configuration information set 2 | Pilot type B, first set of pilots |
| Candidate transmission configuration information set 3 | Pilot type B, second set of pilots |
| Candidate transmission configuration information set 4 | Pilot type C, second set of pilots |

That is to say, the candidate transmission configuration information set may be in transmission association with different types of pilot signals or may be bound to different sets of pilot signals of the same type of pilot. Here the different sets of pilot signals correspond to their respective transmission configuration information.

For example, one candidate transmission configuration information set is in transmission association with two Channel State Information-Reference Signal (CSI-RS) set having different configurations, or in transmission association with one CSI-RS set and one Sounding Reference Signal (SRS) set, or in transmission association with one synchronization signal set and one CSI-RS or SRS set, or in transmission association with one Beam Reference Signal (BRS) set and one CSI-RS set, or in transmission association with one BRS set and one SRS set, or in transmission association with one BRS set and one Demodulation Reference Signal (DMRS) set. Here the synchronization signals may be downlink synchronization signals or uplink random access signals (or referred to as uplink synchronization signals).

Further, when Q is greater than 1, the Q candidate transmission configuration information sets include: a candidate transmission configuration information set in transmission association with an uplink reference signal and a candidate transmission configuration information set in transmission association with a downlink reference signal; or include candidate transmission configuration information sets in transmission association with multiple types of pilot signals or multiple sets of pilot signals separately; or include a candidate transmission configuration information set in transmission association with a synchronization signal and a candidate transmission configuration information set in transmission association with a pilot signal.

Here the reference signal may be a pilot signal or a synchronization signal, the pilot signal may be a measurement pilot signal or a demodulation pilot signal, and the synchronization signal may be a random access signal.

In 602, one candidate transmission configuration information set is determined among the Q candidate transmission configuration information sets by way of selection.

When Q is equal to 1, a unique candidate transmission configuration information set is selected.

When Q is greater than 1, the transmission configuration information set may be further flexibly selected.

Further, when Q is greater than 1 and after the one candidate transmission configuration information set is determined among the Q candidate transmission configuration information sets by way of selection, the method further includes: notifying the terminal of the determined candidate transmission configuration information set. Here the determined candidate transmission configuration information set may be notified to the terminal by using a signaling, where generally, the size of the signaling may be log 2(Q) bits. Alternatively, the signaling and other indication information may be jointly coded, and then indication information generated after the joint coding is sent to the terminal.

Further, after one candidate transmission configuration information set is selected from the Q candidate transmission configuration information sets, a channel and/or a signal is received or sent according to the selected transmission configuration information.

In 603, at least one type of transmission configuration information is selected from the determined candidate transmission configuration information set.

In an implementation, at least one type of transmission configuration information may be selected from the determined candidate transmission configuration information set according to the quality feedback information of the terminal or the measurement information of an uplink signal.

In 604, the selected transmission configuration information is transmitted to the terminal by using a signaling.

After this, the transmission configuration process of the second embodiment of the present disclosure is completed. It can be seen that when Q is equal to 1, only the selected transmission configuration information needs to be sent to the terminal by using a signaling; when Q is greater than 1, both the selected candidate transmission configuration information set and the selected transmission configuration information need to be sent to the terminal by using a signaling.

On the basis of the second embodiment of the present disclosure, corresponding candidate transmission configuration information sets may also be configured for different types of reference signals. For example, corresponding beam transmission information may be configured for different types of reference signals; and corresponding transmission configuration information sets may be configured for different channels or signals. The candidate transmission configuration information set includes transmission configuration information, and the transmission configuration information is used for configuration of transmission information such as beam transmission information. Therefore, as regards the characteristics of different signals, different transmission configuration information can be used. In this way, transmission configuration information can be flexibly configured. For example, wide-beam transmission is used for a control channel and narrow-beam transmission is used for a data channel.

Third Embodiment

A third embodiment of the present disclosure provides a transmission configuration determination method. The method is applicable to equipment such as a terminal. FIG. 7 is a flowchart of one embodiment of a transmission configuration determination method according to embodiments of the present disclosure. As shown in FIG. 7, the method includes the followings.

In 701, a candidate transmission configuration information set is determined, where the determined candidate transmission configuration information set includes K types of transmission configuration information, and each of the K types of transmission configuration information is used for implementing transmission configuration of a signal and/or a channel, where K is greater than or equal to 1.

In an implementation, each piece of transmission configuration information in the determined candidate transmission configuration information set can be used for configuration of at least one of an uplink channel, an uplink signal, a downlink channel and a downlink signal. Here the types of the uplink channel, the uplink signal, the downlink channel and the downlink channel are not limited.

In an implementation, the determined candidate transmission configuration information set includes transmission configuration information corresponding to at least two types of signals. That is, the determined candidate transmission configuration information set includes transmission configuration information in transmission association with at least two types of signals.

The candidate transmission configuration information set may be configured by a high-layer signaling sent by a base station. Here the high-layer signaling may be a protocol-layer signaling above the physical layer, such as a MAC-layer signaling and a Radio Resource Control (RRC)-layer signaling.

In 702, selection indication information from the base station is selected, where the selection indication information is used for indicating selection of at least one type of transmission configuration information from the determined candidate transmission configuration information set.

By way of example, the selection indication information is carried in a physical-layer signaling of the base station.

In an embodiment, before the at least one type of transmission configuration information is selected from the determined candidate transmission configuration information set, the method further includes: grouping at least one of an uplink channel, an uplink signal, a downlink channel or a downlink signal; correspondingly, the selection indication information includes: a control signaling corresponding to each group of channels or signals, where the control signaling corresponding to the each group of channels or signals is used for selecting transmission configuration information corresponding to the each group of channels or signals from the determined candidate transmission configuration information set; and selecting the at least one type of transmission configuration information from the determined candidate transmission configuration information set according to the selection indication information includes: selecting the transmission configuration information corresponding to the each group of channel or signals from the determined candidate transmission configuration information set according to the control signaling corresponding to the each group of channels or signals.

In an implementation, grouping the at least one of the uplink channel, the uplink signal, the downlink channel or the downlink signal includes: receiving a channel or signal grouping manner sent by the base station; and grouping the at least one of the uplink channel, the uplink signal, the downlink channel or the downlink signal according to the received channel or signal grouping manner.

In an implementation, the each group of channels or signals obtained from the grouping include at least one group of channels including an uplink control channel and a downlink control channel; or the each group of channels or signals obtained from the grouping include at least one group of signals including an uplink measurement pilot signal and a downlink measurement pilot signal.

In another embodiment, this may be implemented in the manners described below.

Manner 1

The selection indication information includes: a control signaling corresponding to an uplink channel and a control signaling corresponding to a downlink channel, where the control signaling corresponding to the uplink channel is used for selecting transmission configuration information corresponding to the uplink channel from the determined candidate transmission configuration information set and the control signaling corresponding to the downlink channel is used for selecting transmission configuration information corresponding to the downlink channel from the determined candidate transmission configuration information set; and correspondingly, selecting the at least one type of transmission configuration information from the determined candidate transmission configuration information set according to the selection indication information includes: selecting the transmission configuration information corresponding to the uplink channel and the transmission configuration information corresponding to the downlink channel separately from the determined candidate transmission configuration information set according to the selection indication information.

Manner 2

The selection indication information includes: a control signaling corresponding to an uplink signal and a control signaling corresponding to a downlink signal, where the control signaling corresponding to the uplink signal is used for selecting transmission configuration information corresponding to the uplink signal from the determined candidate transmission configuration information set and the control signaling corresponding to the downlink signal is used for selecting transmission configuration information corresponding to the downlink signal from the determined candidate transmission configuration information set; and correspondingly, selecting the at least one type of transmission configuration information from the determined candidate transmission configuration information set according to the selection indication information includes: selecting the transmission configuration information corresponding to the uplink signal and the transmission configuration information corresponding to the downlink signal separately from the determined candidate transmission configuration information set according to the selection indication information.

Manner 3

The selection indication information includes: a control signaling corresponding to a pilot signal and a control signaling corresponding to a control channel, where the control signaling corresponding to the pilot signal is used for selecting transmission configuration information corresponding to the pilot signal from the determined candidate transmission configuration information set and the control signaling corresponding to the control channel is used for selecting transmission configuration information corresponding to the control channel from the determined candidate transmission configuration information set; and correspondingly, selecting the at least one type of transmission configuration information from the determined candidate transmission configuration information set according to the selection indication information includes: selecting the transmission configuration information corresponding to the pilot signal and the transmission configuration information corresponding to the control channel separately from the determined candidate transmission configuration information set according to the selection indication information.

Manner 4

The selection indication information includes: a control signaling corresponding to the pilot signal and a control signaling corresponding to a data channel, where the control signaling corresponding to the pilot signal is used for selecting transmission configuration information corresponding to the pilot signal from the determined candidate transmission configuration information set and the control signaling corresponding to the data channel is used for selecting transmission configuration information corresponding to the data channel from the determined candidate transmission configuration information set; and correspondingly, selecting the at least one type of transmission configuration information from the determined candidate transmission configuration information set according to the selection indication information includes: selecting the transmission configuration information corresponding to the pilot signal and the transmission configuration information corresponding to the data channel separately from the determined candidate transmission configuration information set according to the selection indication information.

Manner 5

The selection indication information includes: control signalings corresponding to a plurality of types of pilot signals or a plurality of sets of pilot signals, where a control signaling corresponding to each type of the types of pilot signals or each set of the sets of pilot signals is used for selecting transmission configuration information corresponding to the each type of the types of pilot signals or the each set of the sets of pilot signals from the determined candidate transmission configuration information set; and correspondingly, selecting the at least one type of transmission configuration information from the determined candidate transmission configuration information set according to the selection indication information includes: selecting transmission configuration information corresponding to the each type of the types of pilot signals or the each set of the sets of pilot signals from the determined candidate transmission configuration information set according to the selection indication information.

Manner 6

The selection indication information includes: control signalings corresponding to a plurality of control regions of time-frequency-code resources, where a control signaling corresponding to each of the control regions of the time-frequency-code resources is used for selecting transmission configuration information corresponding to the each of the control regions of the time-frequency-code resources from the determined candidate transmission configuration information set; and correspondingly, selecting the at least one type of transmission configuration information from the determined candidate transmission configuration information set according to the selection indication information includes: selecting transmission configuration information corresponding to the control regions of the time-frequency-code resources from the determined candidate transmission configuration information set according to the selection indication information.

Manner 7

The selection indication information includes: control signalings corresponding to multiple pieces of control information or multiple data information code blocks, where a control signaling corresponding to each of the multiple pieces of control information is used for selecting corresponding transmission configuration information from the determined candidate transmission configuration information set and a control signaling corresponding to each of the multiple data information code blocks is used for selecting corresponding transmission configuration information from the determined candidate transmission configuration information set; and correspondingly, the selecting the one or more types of transmission configuration information from the determined candidate transmission configuration information set according to the selection indication information includes: selecting transmission configuration information corresponding to the each of the multiple pieces of control information or the each of the multiple data information code blocks from the determined candidate transmission configuration information set according to the selection indication information.

Manner 8

The selection indication information includes: control signalings corresponding to a plurality of transport layers, where a control signaling corresponding to each of the transport layers is used for selecting transmission configuration information corresponding to the each of the transport layers from the determined candidate transmission configuration information set; and correspondingly, selecting the at least one type of transmission configuration information from the determined candidate transmission configuration information set according to the selection indication information includes: selecting transmission configuration information corresponding to the each of the transport layers from the determined candidate transmission configuration information set according to the selection indication information.

In 703, the at least one type of transmission configuration information is selected from the determined candidate transmission configuration information set according to the selection indication information.

Further, after the at least one type of transmission configuration information is selected from the determined candidate transmission configuration information set, a channel and/or a signal may be received or sent according to the selected transmission configuration information.

Fourth Embodiment

A fourth embodiment of the present disclosure provides another transmission configuration determination method. The method is applicable to equipment such as a terminal. FIG. 8 is a flowchart of another embodiment of a transmission configuration determination method according to embodiments of the present disclosure. As shown in FIG. 8, the method includes the followings.

In 801, Q candidate transmission configuration information sets are determined, where each candidate transmission configuration information set includes at least one type of transmission configuration information, and each type of transmission configuration information is used for implementing transmission configuration of a signal and/or a channel, where Q is greater than or equal to 1.

By way of example, determining the Q candidate transmission configuration information sets includes: determining the Q candidate transmission configuration information sets according to a channel type and/or a signal type, where each type of channel or each type of signal corresponds to at least one of the candidate transmission configuration information sets.

In an implementation, the Q candidate transmission configuration information sets include: different candidate transmission configuration information sets corresponding to a control channel and a data channel separately; or the Q candidate transmission configuration information sets include: different candidate transmission configuration information sets corresponding to the data channel and a measurement pilot signal separately; or the Q candidate transmission configuration information sets include: different candidate transmission configuration information sets corresponding to the control channel and the measurement pilot signal separately; or the Q candidate transmission configuration information sets include: Q1 candidate transmission configuration information sets corresponding to a first type of signal, and Q2 candidate transmission configuration information sets corresponding to a second type of signal, where Q1 is not equal to Q2; or the Q candidate transmission configuration information sets include: Q3 candidate transmission configuration information sets corresponding to a first type of channel, and Q4 candidate transmission configuration information sets corresponding to a second type of channel, where Q3 is not equal to Q4; or the Q candidate transmission configuration information sets include: Q5 candidate transmission configuration information sets corresponding to a third type of signal, and Q6 candidate transmission configuration information sets corresponding to a third type of channel, where Q5 is not equal to Q6.

By way of example, when Q is greater than 1, the Q candidate transmission configuration information sets include: candidate transmission configuration information sets corresponding to two different reference signals separately or different candidate transmission configuration information sets corresponding to at least two different types of signals separately. Here, the reference signal may be a pilot signal or a synchronization signal.

Further, when Q is greater than 1, the Q candidate transmission configuration information sets include: a candidate transmission configuration information set corresponding to an uplink reference signal and a candidate transmission configuration information set corresponding to a downlink reference signal; or the Q candidate transmission configuration information sets comprise: candidate transmission configuration information sets corresponding to a plurality of types of pilot signals or a plurality of sets of pilot signals separately; or the Q candidate transmission configuration information sets comprise: a candidate transmission configuration information set corresponding to a synchronization signal and a candidate transmission configuration information set corresponding to a pilot signal.

In 802, one candidate transmission configuration information set is determined among the Q candidate transmission configuration information sets by way of selection.

In an implementation, an indication signaling sent by the base station may be received, where the indication signaling is used for indicating selection of the one candidate transmission configuration information set from the Q candidate transmission configuration information sets; and then the one candidate transmission configuration information set is selected from the Q candidate transmission configuration information sets according to the indication signaling.

In 803, selection indication information from the base station is selected, where the selection indication information is used for indicating selection of at least one type of transmission configuration information from the determined candidate transmission configuration information set.

In 804, the at least one type of transmission configuration information is selected from the determined candidate transmission configuration information set according to the selection indication information.

Further, after the at least one type of transmission configuration information is selected from the determined candidate transmission configuration information set, a channel and/or a signal may be received or sent according to the selected transmission configuration information.

Fifth Embodiment

As regards the transmission configuration methods in the first embodiment and the second embodiment of the present disclosure, a fifth embodiment of the present disclosure provides a base station. FIG. 9 is a structure diagram of a base station according to embodiments of the present disclosure. As shown in FIG. 9, the base station includes: a first processor 901 and a first signal transceiver 902.

The first processor 901 is configured to determine a candidate transmission configuration information set, where the determined candidate transmission configuration information set includes K types of transmission configuration information, and each of the K types of transmission configuration information is used for implementing transmission configuration of a signal and/or a channel, where K is greater than or equal to 1.

The first processor 901 is further configured to select at least one type of transmission configuration information from the determined candidate transmission configuration information set and to send the selected transmission configuration information to the first signal transceiver 902.

The first signal transceiver 902 is configured to transmit the selected transmission configuration information to a terminal by using a signaling.

Sixth Embodiment

As regards the transmission configuration determination methods in the third embodiment and the fourth embodiment of the present disclosure, a sixth embodiment of the present disclosure provides a terminal. FIG. 10 is a structure diagram of a terminal according to embodiments of the present disclosure. As shown in FIG. 10, the terminal includes: a second processor 1001 and a second signal transceiver 1002.

The second processor 1001 is configured to determine a candidate transmission configuration information set, where the determined candidate transmission configuration information set includes K types of transmission configuration information, and each of the K types of transmission configuration information is used for implementing transmission configuration of a signal and/or a channel, where K is greater than or equal to 1.

The second signal transceiver 1002 is configured to receive selection indication information from a base station and to send the selection indication information to the second processor, where the selection indication information is used for indicating selection of at least one type of transmission configuration information from the determined candidate transmission configuration information set.

The second processor 1001 is further configured to select the at least one type of transmission configuration information from the determined candidate transmission configuration information set according to the selection indication information.

It is to be understood by those skilled in the art that embodiments of the present disclosure may be provided as methods, systems or computer program products. Therefore, the present application may take the form of a hardware embodiment, a software embodiment, or an embodiment combining software and hardware. The present application may take the form of a computer program product implemented in one or more computer-usable storage media (including, but not limited to, a disk memory and an optical memory) that includes computer-usable program codes.

The present application is described with reference to flowcharts and/or block diagrams of the method, apparatus (system) and computer program product according to embodiments of the present disclosure. It is to be understood that the computer program instructions can be used to implement each flow and/or block in the flowcharts and/or block diagrams and a combination of flows and/or blocks in the flowcharts and/or block diagrams. These computer program instructions can be provided to a processor of a general purpose computer, special purpose computer, embedded processor, or another programmable data processing device to produce a machine, so as to enable instructions executed by a processor of a computer or another programmable data processing device to generate an apparatus for implementing the functions specified in one or more flows in the flowcharts and/or one or more blocks in the block diagrams.

The computer program instructions can also be stored in a computer-readable memory that can direct a computer or another programmable data processing device to operate in a particular manner, so that the instructions stored in the computer-readable memory produce an article of manufacture including an instruction apparatus. The instruction apparatus implements the functions specified in one or more flows in the flowcharts and/or one or more blocks in the block diagrams.

These computer program instructions can also be loaded onto a computer or another programmable data processing device, so that a series of operating are performed on a computer or another programmable device, and the instructions executed on the computer or another programmable device provide procedures for implementing the functions specified in one or more flows in the flowcharts and/or one or more blocks in the block diagrams.

The above-mentioned are only embodiments of the present disclosure and are not intended to limit the scope of the present application.

INDUSTRIAL APPLICABILITY

In the transmission configuration method, transmission configuration determination method, base station, terminal and computer storage medium provided in embodiments of the present disclosure, a candidate transmission configuration information set is determined, where the determined candidate transmission configuration information set includes K types of transmission configuration information, and each of the K types of transmission configuration information is used for implementing transmission configuration of at least one of a signal or a channel, where K is greater than or equal to 1; at least one type of transmission configuration information is selected from the determined candidate transmission configuration information set; and the selected transmission configuration information is transmitted to the terminal by using a signaling. In this way, the transmission configuration information can be configured flexibly, thereby better meeting the transmission requirements and improving the transmission performance of the communication system.

The invention claimed is:

1. A method performed by a User Equipment (UE), the method comprising:
determining, based on first information received from a network node, a first Transmission Configuration Information (TCI) set, including a first plurality of TCIs, and the first TCI set is for receiving a downlink control channel associated with the network node;
determining, based on second information received from the network node, a second TCI set including a second plurality of TCIs, and the second TCI set is for receiving a downlink data channel associated with the network node;
receiving, from the network node, a first indication of a first TCI from the first TCI set;
receiving, from the network node, the downlink control channel using the indicated first TCI;
receiving, from the network node, a second indication of a second TCI from the second TCI set; and
receiving, from the network node, the PDSCH downlink data channel using the indicated second TCI.

2. The method of claim 1, wherein each TCI is associated with beam transmission information, and the respective beam transmission information is used by the UE for receiving the downlink control channel and the downlink data channel.

3. The method of claim 1, wherein the first indication of the first TCI from the first TCI set or the second indication of the second TCI from the second TCI set is received via physical layer control signaling.

4. The method of claim 1, wherein the first TCI set is different from the second TCI set.

5. The method of claim 1, wherein the first TCI is different from the second TCI.

6. The method of claim 1, wherein the first TCI set is further for receiving the downlink data channel.

7. A User Equipment (UE) comprising:
a processor configured to determine, based on first information received from a network node, a first Transmission Configuration Information (TCI) set including a first plurality of TCIs, and the first TCI set is for receiving a downlink control channel associated with the network node;
the processor further configured to determine, based on second information received from the network node, a second TCI set including a second plurality of TCIs, and the second TCI set is for receiving a downlink data channel associated with the network node; and
a transceiver configured to receive, from the network node, a first indication of a first TCI from the first TCI set;
the transceiver further configured to receive, from the network node, the downlink control channel using the indicated first TCI;
the transceiver further configured to receive, from the network node, a second indication of a second TCI from the second TCI set;

the transceiver further configured to receive, from the network node, the downlink data channel using the indicated second TCI.

8. The UE of claim 7, wherein each TCI is associated with beam transmission information, and the respective beam transmission information is used by the UE for receiving the downlink control channel and the downlink data channel.

9. The UE of claim 7, wherein the first TCI set is different from the second TCI set.

10. The UE of claim 7, wherein the first TCI is different from the second TCI.

11. The UE of claim 7, wherein the first TCI set is further for receiving the downlink data channel.

12. A method performed by a User Equipment (UE), the method comprising:

determining, based on information received from a network node, a Transmission Configuration Information (TCI) set including a first plurality of TCIs for receiving a downlink control channel associated with the network node and a second plurality of TCIs for receiving a downlink data channel associated with the network node;

receiving, from the network node, selection indication information indicating a first TCI from the first plurality of TCIs and a second TCI from the second plurality of TCIs; and receiving, from the network node, the downlink control channel and the downlink data channel using the respective first TCI and second TCI.

13. The method of claim 12, wherein each TCI is associated with beam transmission information, and the respective beam transmission information is used by the UE for receiving the downlink control channel and the downlink data channel.

14. The method of claim 12, wherein the first plurality of TCIs is different from the second plurality of TCIs.

15. The method of claim 12, wherein the first TCI is different from the second TCI.

16. A User Equipment (UE) comprising:

a processor configured to determine, based on information received from a network node, a Transmission Configuration Information (TCI) set including a first plurality of TCIs for receiving a downlink control channel associated with the network node and a second plurality of TCIs for receiving a downlink data channel associated with the network node; and a transceiver configured to receive, from the network node, selection indication information indicating a first TCI from the first plurality of TCIs and a second TCI from the second plurality of TCIs;

the transceiver further configured to receive, from the network node, the downlink control channel and the downlink data channel using the respective first TCI and second TCI.

17. The UE of claim 16, wherein the first plurality of TCIs is different from the second plurality of TCIs.

18. The UE of claim 17, wherein each TCI is associated with beam transmission information, and the respective beam transmission information is used by the UE for receiving the downlink control channel and the downlink data channel.

19. The UE of claim 17, wherein the first TCI is different from the second TCI.

* * * * *